Dec. 28, 1926.  
A. JOSLEN  
1,612,027  
MILK CALIPERS  
Filed Jan. 15, 1924
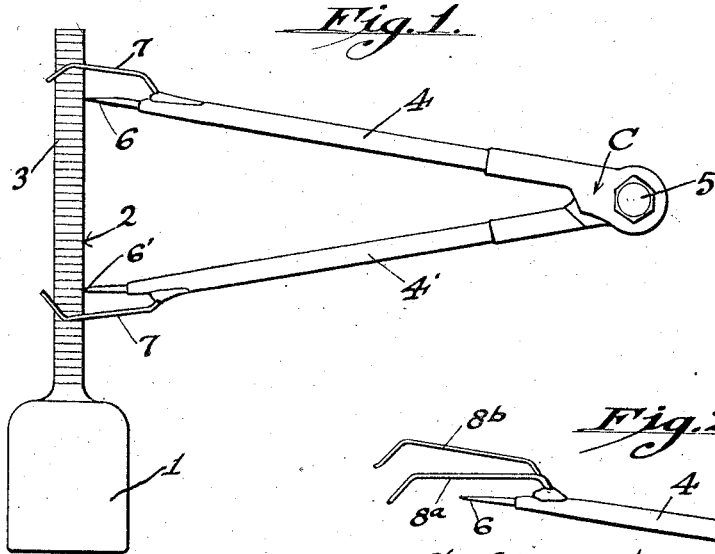
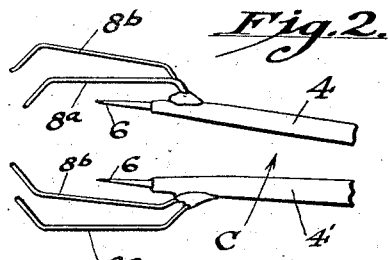
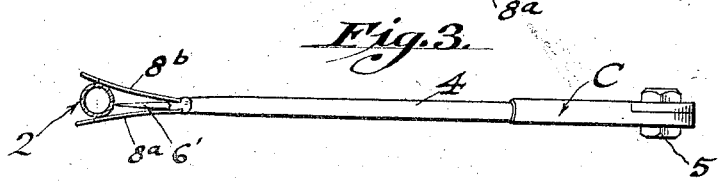
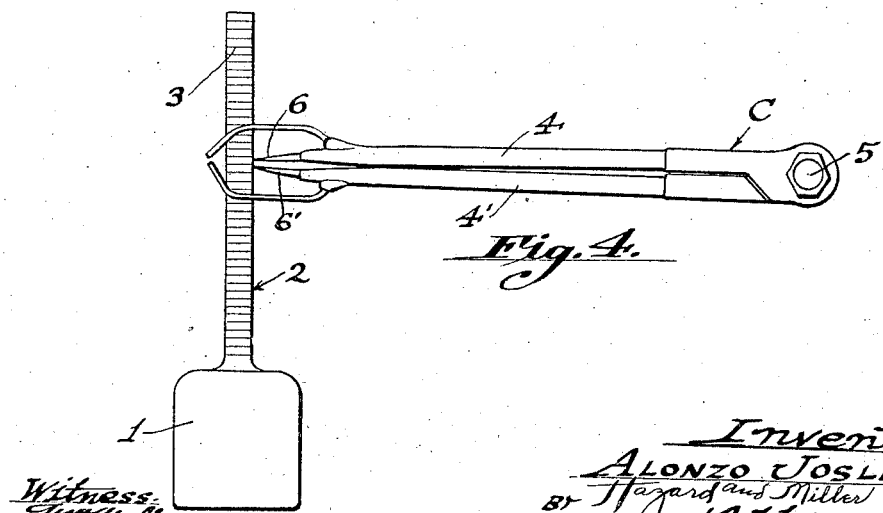
Inventor  
ALONZO JOSLEN  
By Hazard and Miller  
Attorneys
Witness Patented Dec. 28, 1926.

1,612,027

UNITED STATES PATENT OFFICE.

ALONZO JOSLEN, OF POMONA, CALIFORNIA, ASSIGNOR OF ONE-HALF TO W. ANNAN COOK, OF POMONA, CALIFORNIA.

MILK CALIPERS.

Application filed January 15, 1924. Serial No. 686,258.

My present invention being referred to as milk calipers, it may be understood to be an object of this invention to provide a pair of calipers suitably modified to facilitate the use of the same in the determination of the fat content of milk, cream, or the like. It is an object of this invention to provide an improved type of milk calipers provided with means to facilitate the application thereof to the graduated neck of a bottle such as is currently used in the execution of the Babcock test, or the like; and a preferred embodiment of my invention may comprise a pair of caliper legs, one or both of which may be provided with a finger or fingers, secured to the outer surface of a caliper leg in such manner as to aid in the adjustment and retention of a pair of calipers in an intended relationship to the graduated neck of a bottle.

It being well known that in the execution of a test for butter fat in milk, or in the execution of a similar test upon cream or upon skim milk, or the like, the length of the column of butter fat, produced by centrifuging under standard conditions, is customarily measured by the use of a pair of calipers (which are first adjusted with their respective points opposite the upper meniscus and the lower meniscus of a column of fat and then transferred to a position bringing one leg opposite the zero reading of the graduated scale), it is an object of my present invention to provide means tending to guide a pair of calipers into suitable contact with a graduated bottle neck or stem, without obscuring or hindering the subsequent reading of the scale referred to; and, in a preferred embodiment of my invention I may employ a finger or fingers divergent from a leg or legs of a pair of calipers to such a degree that the points of the said calipers shall contact with a graduated neck in such manner that the axis thereof shall not lie in the plane of relative movement of the legs of said calipers.

Other objects of my invention will appear from the following description of preferred and alternative embodiments thereof, and from the appended claims, taken in connection with the accompanying drawings, in which—

Fig. 1 is an elevational view showing a pair of my improved milk calipers as applied to the graduated neck of a Babcock test bottle.

Fig. 2 is a perspective view showing the points of a pair of calipers of my improved design as each provided with a pair of divergent and over-arching guide fingers secured to the respective outer surfaces of the legs thereof.

Fig. 3 may be regarded as a bottom plan view of a pair of calipers of the type shown in Fig. 2, the neck of a Babcock test bottle being shown in section.

Fig. 4 may be regarded as an elevational view of a pair of calipers of either the type shown in Fig. 1 or the type shown in Figs. 2 and 3, showing the appearance of the same when approximately closed.

Referring to details of that specific embodiment of my invention shown in Fig. 1, 1 is a test bottle whose neck 2 is provided with graduations 3. C is a pair of calipers comprising legs 4, 4' shown as pivoted together at 5, and as provided with usual points 6, 6' suitable for use in determinating the actual length of a column of fat or the like, by application to the graduated neck of a Babcock test bottle.

Coming now to the strictly novel features of my invention, in order to facilitate and guide the application of a pair of calipers to a graduated neck, I may provide each of the legs 4, 4' with a guide finger 7, 7', rigidly secured thereto. These fingers are preferably secured to the back or outer surfaces of the respective legs, and arched or curved in the manner suggested in Fig. 1, each of the mentioned fingers being preferably divergent from the plane of relative movement of the legs 4, 4' to such an extent that, when a pair of calipers is applied, by a lateral movement, to the side of a graduated neck, the points 6, 6' may move approximately, in a plane extending through the axis of the said neck,—the accurate adjustment of the calipers, and the reading of a scale upon which they may be re-adjusted to zero, being facilitated by the retention of the points 6, 6' in the slightly offset relationship referred to.

Although advantageous results may be obtained by the use of a single guide finger of the character described, and by the use of such a guide finger upon only one of the legs 4, 4', I consider it advantageous to provide not merely a single guide finger but a pair of guide fingers upon each of the said legs, the preferred construction here referred to being illustrated in Figs. 2, 3 and 4. It will be obvious that when guide fingers, or their equivalent, are provided upon both of the legs of a pair of calipers, they may be very promptly brought into a desired relationship to a graduated neck even by an unsteady hand, and that they may be substantially self-retaining thereon. By the use of suitable pairs of divergent fingers, of a character disclosed, and especially by providing each of the mentioned fingers with the over-arch curvature, best shown in Figs. 1, 2 and 4, (the central portion of the over-arch being, however, substantially straight and in a plane substantially parallel with the axis of the leg to which it is secured) I may moreover adapt my calipers to use upon necks of various diameters, gaining all of the advantages above referred to without obscuring, to a disadvantageous extent, the graduations upon a bottle neck; and, by rendering the respective fingers 8$^a$ and 8$^b$ of each pair unequally divergent from the plane of relative movement of the legs 4, 4' to which the said fingers are permanently secured, I may cause the caliper points 6, 6' automatically to contact in a line slightly offset relatively to the axis of a bottle neck, in a manner already referred to, and as best shown in Fig. 3. Although any preferred alternative curvature may be imparted to the respective guide fingers upon a leg 4 or 4', I consider it advantageous to curve or bend the outer ends of the fingers of each leg towards the corresponding ends of the fingers of the opposite leg in such manner that, upon the closing of the pair of calipers, the ends of the respective fingers of one leg may be opposed to those of the other leg, thereby affording them mutual protection.

By rebending the ends of the guide fingers inwardly towards the axes of their respective legs, it will be appreciated that when the legs 4, 4' of the calipers are greatly separated, that is, in taking a large reading, the ends of the guide fingers will always be able to contact with the neck 2 of the bottle 1. If the ends of the guide fingers are constructed so as to remain straight when the calipers are taking a large reading, the points of the calipers will contact with the bottle, whereas the ends of the guide fingers will hardly engage it. For this reason, the ends of the guide fingers are rebent so that regardless of the reading taken by the calipers, the guide fingers will always engage the neck of the bottle.

By the back of the leg as used in the claims, I mean the side of the leg remote from the opposite leg when the legs are in closed position.

Although I have herein described a preferred embodiment and alluded to alternative embodiments of my invention, it will be understood that various features of my invention are capable of independent use, and also that various additions and modifications might be made by those skilled in the art without involving a departure from the spirit and scope of my invention, as the same is indicated above and in the following claims.

What I claim is:

1. A milk calipers comprising a pair of pivoted, pointed legs, and a pair of guide fingers secured to each leg some distance back from the pointed end thereof, said guide fingers extending beyond the pointed ends of said legs.

2. A milk calipers comprising a pair of pivoted pointed legs, a pair of divergent guide fingers secured to the back of each leg at a distance from the point of the leg to which the fingers are secured, the guide fingers of each pair being divergent with respect to each other and extending forwardly beyond the pointed end of the leg on which they are secured so as to expose the pointed end of the leg therebetween.

3. A milk calipers comprising a pair of pivoted pointed legs, and a pair of guide fingers secured to each leg, each pair of guide fingers being secured to the back of its respective leg and extending outwardly and forwardly therefrom beyond the pointed end of the leg, said fingers diverging forwardly with respect to the axis of the leg.

4. A milk calipers comprising a pair of pivoted, pointed legs, and a pair of guide fingers secured to each leg, each pair of guide fingers being secured to the back of its respective leg and extending outwardly and forwardly therefrom beyond the pointed end of the leg, said fingers diverging forwardly with respect to the axis of the leg, the ends of the fingers of each leg being bent toward the corresponding fingers on the other leg as and for the purpose described.

5. A milk calipers comprising a pair of pivoted legs, and a guide finger secured to the back of each leg and extending outwardly and forwardly therefrom beyond the end of the leg, said guide fingers being oblique to the axes of their respective legs and being opposed to each other, the forward ends of the fingers of each leg being bent toward the fingers of the other leg as and for the purpose described.

6. A milk calipers comprising a pair of legs, and a pair of guide fingers secured to each of said legs and extending from the outer sides thereof, the fingers of each leg being curved or bent toward the corresponding fingers on the other leg.

In testimony whereof I have signed my name to this specification.

ALONZO JOSLEN.